(12) United States Patent
Singh et al.

(10) Patent No.: US 8,720,028 B2
(45) Date of Patent: May 13, 2014

(54) REPLACEABLE FILTER MEDIA AND HOLDING MECHANISM

(75) Inventors: Avnit Singh, Marietta, GA (US); Piyush Banafar, Karnataka (IN)

(73) Assignee: BHA Altair, LLC, Franklin, TN (US)

( * ) Notice: Subject to any disclaimer, the term of this patent is extended or adjusted under 35 U.S.C. 154(b) by 390 days.

(21) Appl. No.: 13/113,508

(22) Filed: May 23, 2011

(65) Prior Publication Data

US 2012/0297599 A1    Nov. 29, 2012

(51) Int. Cl.
*B23P 6/00*    (2006.01)
*B01D 35/30*    (2006.01)

(52) U.S. Cl.
USPC ........................................ 29/402.08; 210/232

(58) Field of Classification Search
USPC ............. 29/402.08, 402.03, 402.01; 210/232; 55/307, 332, 350.1, 482, 483, 497, 502
See application file for complete search history.

(56) References Cited

U.S. PATENT DOCUMENTS

| | | |
|---|---|---|
| 4,969,936 A | 11/1990 | Schweigert et al. |
| 5,222,488 A | 6/1993 | Forsgren |
| 5,302,354 A | 4/1994 | Watvedt et al. |
| 5,554,203 A | 9/1996 | Borkent et al. |
| 6,533,847 B2 | 3/2003 | Seguin et al. |
| 6,585,793 B2 | 7/2003 | Richerson et al. |
| 6,598,580 B2 | 7/2003 | Baumann et al. |
| 6,676,721 B1* | 1/2004 | Gillingham et al. ............ 55/302 |
| 7,090,711 B2 | 8/2006 | Gillingham et al. |
| 2003/0159415 A1 | 8/2003 | Parker |
| 2004/0020177 A1 | 2/2004 | Ota et al. |
| 2004/0182055 A1 | 9/2004 | Wynn |
| 2006/0260284 A1 | 11/2006 | Masciotra |
| 2007/0204579 A1 | 9/2007 | Karlsson et al. |
| 2011/0225939 A1 | 9/2011 | Loggins et al. |

FOREIGN PATENT DOCUMENTS

| | | |
|---|---|---|
| EP | 1749562 A2 | 2/2007 |
| WO | 2008016341 A2 | 2/2008 |

OTHER PUBLICATIONS

Search Report from corresponding GB Application No. GB1208757.3 dated Sep. 18, 2012.

* cited by examiner

*Primary Examiner* — John C Hong
(74) *Attorney, Agent, or Firm* — Reinhart Boerner Van Deuren s.c.

(57) ABSTRACT

A replaceable filter media and holding mechanism apparatus is provided and includes a shell defining a pathway and an insertion bay and a body having filter media disposed therein, first and second air permeable faces on opposite sides of the filter media and first and second edge faces extending between corresponding ends of the first and second air permeable faces, the body being insertible into the insertion bay to position the filter media for filtering air flowing along the pathway with the first edge face leading the second edge face and being removable from the insertion bay with the second edge face leading the first edge face.

19 Claims, 3 Drawing Sheets

REPLACEABLE FILTER MEDIA AND HOLDING MECHANISM

BACKGROUND OF THE INVENTION

The subject matter disclosed herein relates to a replaceable filter media and holding mechanism.

Air enters air filters including filter media arrays, which remove particulates from the inlet air. One application for such filters is in Heating, Ventilation and Air conditioning (HVAC) systems and another common application is in gas turbine inlets.

A typical air filter assembly includes a media pack encased in a rigid shell that may be made of plastic or some equivalent material. The media pack is used to filter air while the shell provides a rigid housing to stabilize and support the media pack with a seal against the mounting structure. Over the lifetime of the filter assembly, the media pack becomes increasingly clogged and/or damaged and eventually needs to be replaced at the end of its lifetime. When the filter assembly reaches the end of its lifetime, the entire assembly is replaced including the media pack and the rigid plastic shell.

The cost of the filter assembly and the cost of shipping the entire assembly for each replacement means that replacement of the entire filter assembly can be an expensive process.

BRIEF DESCRIPTION OF THE INVENTION

According to one aspect of the invention, a replaceable filter media and holding mechanism apparatus is provided and includes a shell defining a pathway and an insertion bay and a body having filter media disposed therein, first and second air permeable faces on opposite sides of the filter media and first and second edge faces extending between corresponding ends of the first and second air permeable faces, the body being insertible into the insertion bay to position the filter media for filtering air flowing along the pathway with the first edge face leading the second edge face and being removable from the insertion bay with the second edge face leading the first edge face.

According to another aspect of the invention, a replaceable filter media and holding mechanism apparatus for a gas turbine inlet defining an upstream portion of an airflow pathway is provided and includes a shell defining a plurality of filter units, each of which includes a rear member, legs extending from opposite ends of the rear member and defining downstream portions of the airflow pathway and insertion bays, media packs, each being removably insertible into each of the insertion bays to filter air flowing along the downstream portions of the airflow pathway, and gaskets disposed at edges of each of the media packs to prevent airflow pathway bypass.

According to yet another aspect of the invention, a method of removing for the purpose of replacing filter media is provided and includes arranging a shell to define a filter unit through which a pathway and an insertion bay are defined, forming a body having filter media disposed therein, air permeable faces on opposite sides of the filter media and first and second edge faces extending between corresponding ends of the air permeable faces, inserting the body into the insertion bay to position the filter media for filtering air flowing along the pathway with the first edge face leading the second edge face and removing the body from the insertion bay with the second edge face leading the first edge face.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects of the present invention, a replaceable media pack is provided along with a rigid plastic shell that can remain in place inside an overall housing. The media pack is insertible into and removable from the plastic shell during a replacement procedure and may be sealed against the shell using gasket compression to ensure that air bypass is avoided. By reusing the plastic shell with a series of replaceable media packs, costs of replacing filters are substantially reduced. In addition, while the filter assembly normally has significant shipping costs when shipped as a conventional assembly, replacement of media packs alone can reduce the shipping costs. There may also be savings to environmental costs when disposing of media packs alone versus the disposal cost of a filter assembly.

The media packs can be produced in bulk. The reduction in cost in manufacturing, coupled with shipping costs and lowered material costs will provide an overall cost advantage. Also, since the rigid pack will not be replaced as frequently, the assembly sealing to a holding frame may not be disturbed.

Figure 1:
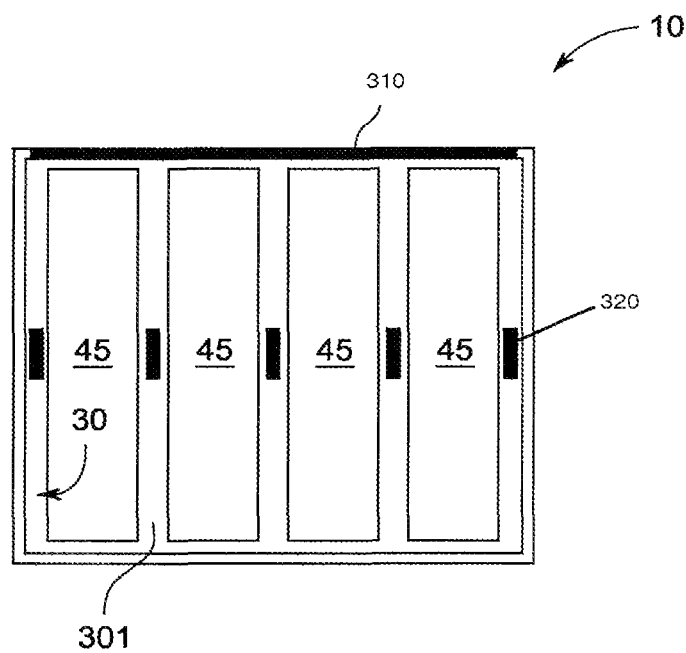
FIG. 1 is an elevation view of a replaceable filter media and holding apparatus.
Figure 2:
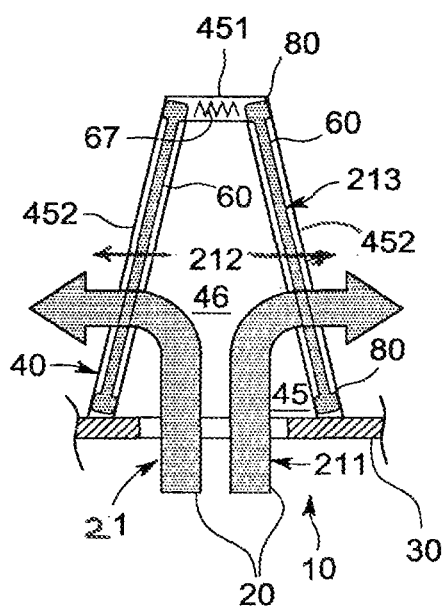
FIG. 2 is an enlarged top down view of the replaceable filter media and holding apparatus of FIG. 1.
Figure 3:
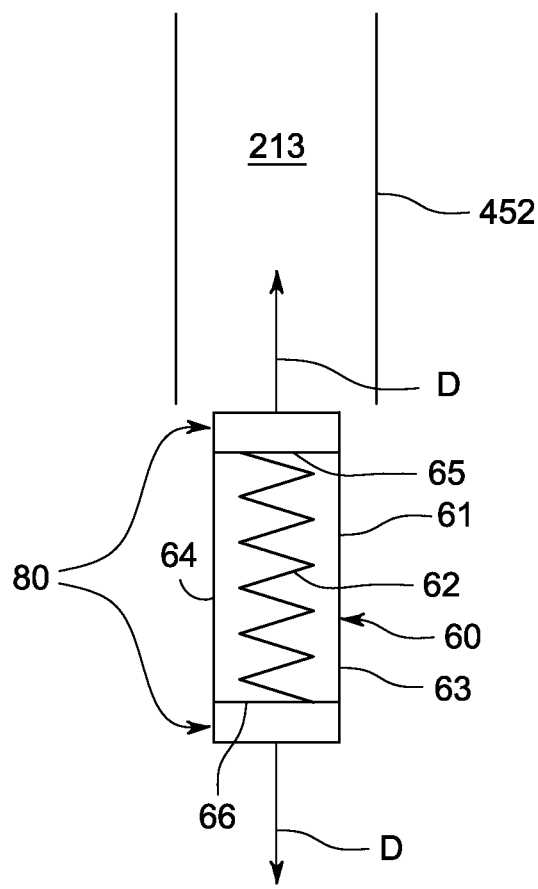
FIG. 3 illustrates an insertion and removal of a media pack from an insertion bay.

With reference to FIGS. 1, 2 and 3, a replaceable filter media and holding mechanism apparatus (hereinafter referred to as "the apparatus") 10 is provided for the filtering of airflow 20 flowing along an airflow pathway of, for example, a gas turbine engine inlet. The apparatus 10 includes a header 30 through which an upstream portion 211 of the airflow pathway is defined, a rigid shell 40, media packs 60 and gaskets 80. The shell 40 extends rearwardly along a direction of airflow from the header 30 and is formed to define a plurality of filter units 45. In accordance with embodiments, each filter unit 45 may include a rear member 451 that is spaced rearwardly from a plane of the header 30 and legs 452. The legs 452 extend from opposite ends of the rear member 451 to the plane of the header 30. The legs 452 are each formed with apertures to transversely define downstream portions 212 of the airflow pathway and insertion bays 213.

Although the downstream portions 212 of the airflow pathway and the insertion bays 213 are described herein as being transverse, it is to be understood that this is merely exemplary and that other configurations are possible without departing from the scope of the application. For example, the downstream portions 212 of the air flow pathway and the insertion bays 213 could be parallel with each other or they could be parallel at one section and transverse at another.

As best seen with reference to FIG. 3, each media pack 60 may include an elongate body 61 having filter media 62 disposed therein, first and second air permeable faces 63, 64 on opposite sides of the filter media 62 and first and second edge faces 65, 66 extending between corresponding ends of the first and second air permeable faces 63, 64. As shown in FIG. 3, the media pack 60 may be removably inserted into and removed from an insertion bay 213 of a leg 452 along an insertion direction, D. This insertion direction, D, defines the first and second edge faces 65, 66 as rearward and forward edges of the media pack 60 and as leading and trailing edges depending on whether the media pack 60 is being inserted into or removed from the insertion bay 213.

The gaskets 80 are disposed at least at the first and second edge faces 65, 66 although they may also be disposed on upper and/or lower edge faces as well. As such, with the media pack 60 inserted into the insertion bay 213, the gasket 80 at the first edge face 65 may be disposed at what may be the rearward edge of the media pack 60 and, in that position, may be disposed to contact with the rear member 451 or with additional filter media 67, which may be disposed therein (see FIG. 2). Meanwhile, the gasket 80 at the second edge face 66 may be disposed at what would be the forward edge of the media pack 60 and, in that position, may contact with the header 30 or an adjacent gasket 80 to prevent airflow bypass about the rearward and forward edges. It is to be understood that embodiments exists in which the media pack 60 is reversible or completely re-oriented as compared to the description herein. In such cases, the end placement of the media pack 60 and the gaskets 80 would remain similar to what is already described.

The media packs 60 are thus disposed such that normal planes of the air permeable faces 63, 64 are oriented transversely with respect to the dominant direction of air flow flowing as part of airflow 20 along the downstream portions 212 of the airflow pathway. The media packs 60 may therefore be positioned to filter air flowing through the legs 452 and along the downstream portions 212 of the airflow pathway. The additional filter media 67 that may be provided in the rear member 451 can increase the total area for air filtering.

With reference back to FIG. 1, the header 30 may include a grill formation having an outer periphery 301 that forces air to flow into the plurality of the filter units 45. In accordance with various configurations of the header 30, the plurality of the filter units 45 may be arranged in a side-to-side array whereby a distance between adjacent filter units 45 is less than a predefined width.

Figure 4:
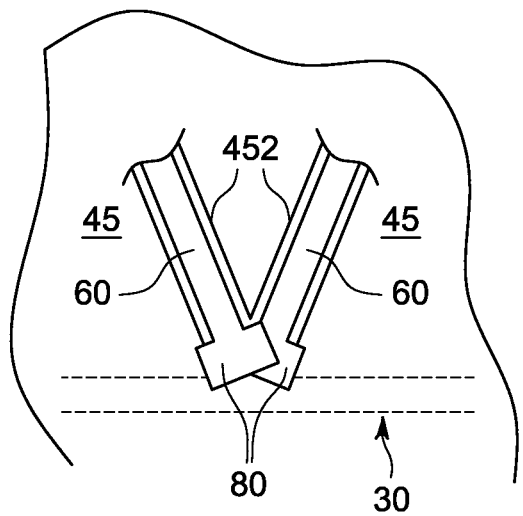
FIG. 4 is an enlarged top down view of gaskets of adjacent media packs.

In accordance with alternative embodiments and, with reference to FIG. 4, adjacent ones of the filter units 45 may abut one another with the corresponding gaskets 80 of adjacent media packs 60 being sealably mated with one another. In this way, airflow therebetween is substantially prevented, materials required for the header 30 may be reduced and total filtering area for an assembly with a given size can be increased.

With reference back to FIG. 2, one or more of each of the plurality of the filter units 45 may have a substantially V-shaped or frusto-conical cross-section with a plane of the rear member 451 disposed substantially in parallel with the plane of the header 30 and the legs 452 splayed laterally outwardly at non-right angles. With this construction, air flowing along the upstream portion 211 of the airflow pathway 21 enters an interior 46 of each of the plurality of the filter units 45 and splits into two portions that each flow in substantially opposite directions toward each of the downstream portions 212 of each of the legs 452.

Figure 5:
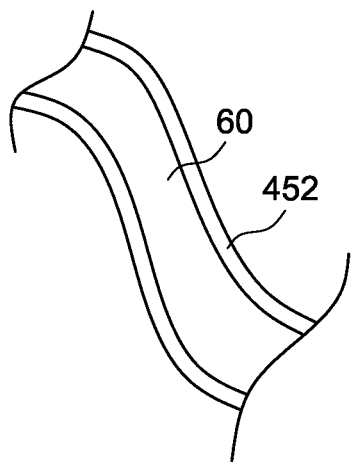
FIG. 5 is an enlarged top down view of a curved leg.
Figure 6:
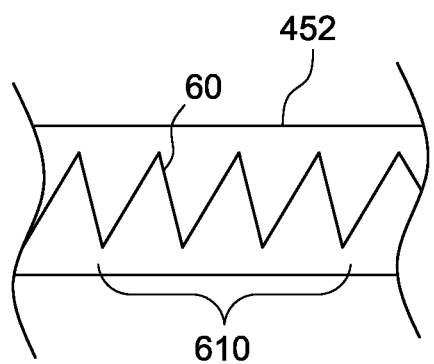
FIGS. 6, 7 and 8 each illustrate various types of filter media.
Figure 7:
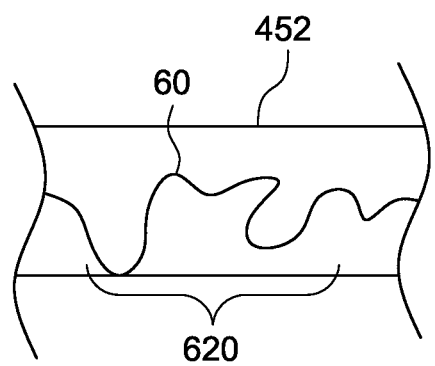
Figure 8:
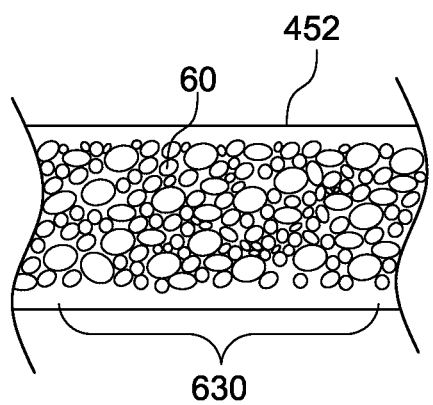

With reference to FIG. 5, one or more of the legs 452 may be curved. In this case, the media pack 60 removably inserted into the insertion bay 213 may assume the curvature of the curved leg 452. The curvature may be provided proximate to the plane of the rear member 451, the plane of the header 30 or along the entire length of the leg 452. With reference to FIGS. 6, 7 and 8, the media packs 60 may include folded or pleated filter media 610 (see FIG. 6), a bag type of filter media 620 (see FIG. 7), a solid and porous filter media 630 (see FIG. 8) or some other similar type of filter media element. In any case, the filter media may be rigid or compliant.

In accordance with further aspects of the invention, a method of assembling a replaceable filter media and holding mechanism apparatus is provided. The method includes arranging a shell 40 extending rearwardly from a header 30 to define a plurality of filter units 45 each including a rear member 451 that is spaced from the header 30 and legs 452 extending from opposite ends of the rear member 451 to the header 30 through which downstream portions 212 of the airflow pathway 21 and insertion bays 213 are transversely defined. The method further includes removably inserting media packs 60 into the insertion bays 213 and disposing gaskets 80 at least at rearward and forward edges of each of the media packs 60.

For the replacement of the media packs 60 without the need to replace the header 30 or the shell 40, the method may further include removing the header 30 from the shell 40 or a housing, replacing one or more of the media packs 60 (i.e., when they are clogged after a predefined lifetime), and re-attaching the header 30 to the shell 40 or the housing. The replacing of the one or more of the media packs 60 may include sliding the one or more of the media packs 60 out of the corresponding insertion bay 213 along the insertion direction, D, and sliding a new media pack 60 into the now vacant insertion bay 213. With reference to FIG. 1, the removing and re-attaching of the header 30 may include one of pivoting the header 30 about a hinge 310 and hanging or fastening the header 30 onto the shell 40 or the housing via holding elements 320.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A replaceable filter media and holding mechanism apparatus for use with a gas turbine inlet, comprising:
   a shell defined by at least two non-parallel legs, with each leg defining an insertion bay, the shell defining a pathway;
   a pair of media packs, with each media pack configured with a replaceable filter media, first and second air permeable faces on opposite sides of the media pack and first and second edge faces extending between corresponding ends of the first and second air permeable faces, one of each media pack configured for insertion into the insertion bay to position the media pack for filtering air flowing along the pathway with the first edge face leading the second edge face and each media pack being individually removable from the insertion bay with the second edge face leading the first edge face.

2. The apparatus according to claim 1, further comprising a header removably attachable to the shell.

3. The apparatus according to claim 2, wherein, with the header attached to the shell and the media pack inserted into the insertion bay, the media pack extends rearwardly from a plane of the header.

4. The apparatus according to claim 1, wherein the shell is substantially rigid.

5. The apparatus according to claim 1, wherein the shell is formed to define a plurality of filter units, each having multiple pathways and insertion bays.

6. The apparatus according to claim 1, wherein one or more of the filter units has one of a V-shape or a frusto-conical shape.

7. The apparatus according to claim 1, further comprising gaskets disposed at the first and second edge faces of the filter media.

8. A replaceable filter media and holding mechanism apparatus for a gas turbine inlet defining an upstream portion of an airflow pathway, the apparatus comprising:
   a shell defining a plurality of filter units, each of which includes:
      a rear member,
      a pair of legs extending from opposite ends of the rear member along non-parallel planes and defining downstream portions of the airflow pathway, with each leg defining an insertion bay configured to receive a media pack, with each media pack configured with a replaceable filter media and with each media pack, individually removable, and individually insertable in the insertion bay without removing the filter unit; and
      gaskets disposed at edges of each of the media pack configured to prevent airflow pathway bypass.

9. The apparatus according to claim 8, wherein the plurality of the filter units is arranged in a side-to-side array.

10. The apparatus according to claim 8, wherein each of the plurality of filter units has a frusto-conical cross-section.

11. The apparatus according to claim 8, wherein one or more of the legs is curved.

12. The apparatus according to claim 8, wherein the media packs comprise folded or pleated filter media.

13. The apparatus according to claim 8, wherein the gaskets are disposed at rearward and forward edges of each media pack.

14. The apparatus according to claim 8, wherein filter media is disposed within the rear member.

15. The apparatus according to claim 8, wherein the gaskets of adjacent media pack s sealable mate with one another.

16. A method of removing and replacing filter media from a gas turbine inlet, the method comprising:
   arranging a shell to define a filter unit through which a pathway and an insertion bay are defined in at least each of two legs of the shell;
   inserting an individual media pack into the insertion bay to position the filter media for filtering air flowing along the pathway with the first edge face leading the second edge face with a replaceable filter media disposed in the media pack and defining air permeable faces on opposite sides of the filter media and first and second edge faces extending between corresponding ends of the air permeable faces; and
   removing the media pack from the insertion bay with the second edge face leading the first edge face.

17. The method according claim 16, further comprising:
   removing a header from the shell;
   replacing the media pack; and
   re-attaching the header to the shell.

18. The method according to claim 17, wherein the replacing step comprises:
   sliding the media pack out of the corresponding insertion bay; and
   sliding a new media pack into the now vacant insertion bay.

19. The method according to claim 17, wherein the removing and re-attaching of the header comprises one of pivoting the header about a hinge, hanging the header onto the shell and fastening the header to the shell.

* * * * *